United States Patent [19]

Masher et al.

[11] 4,426,667
[45] Jan. 17, 1984

[54] PULSE WIDTH MODULATION SYSTEM

[75] Inventors: Dale P. Masher, Los Altos; Leonard J. Chaitin, Palo Alto, both of Calif.

[73] Assignee: Savin Corporation, Stamford, Conn.

[21] Appl. No.: 906,850

[22] Filed: May 17, 1978

[51] Int. Cl.³ ............................................... G11B 5/09
[52] U.S. Cl. ......................................... 360/44; 360/43
[58] Field of Search ....................... 360/51, 43, 48, 40, 360/44

[56] References Cited

U.S. PATENT DOCUMENTS

| | | | |
|---|---|---|---|
| 3,025,503 | 3/1962 | Perry | 360/44 |
| 3,281,806 | 10/1966 | Lawrance et al. | 360/44 |
| 3,597,752 | 8/1971 | Elderr et al. | 360/40 |
| 3,633,190 | 1/1972 | Morsing et al. | 360/48 |
| 3,646,534 | 2/1972 | Miller | 360/40 |
| 3,737,632 | 6/1973 | Barnes | 360/43 |
| 3,916,440 | 10/1975 | Irwin | 360/48 |
| 3,974,523 | 8/1976 | Miller et al. | 360/40 |
| 3,996,586 | 12/1976 | Dillon et al. | 360/40 |
| 4,012,786 | 3/1977 | McKie et al. | 360/43 |
| 4,032,915 | 6/1977 | Shanks et al. | 360/44 |
| 4,040,100 | 8/1977 | Chan | 360/43 |

Primary Examiner—Vincent P. Canney
Attorney, Agent, or Firm—Shenier & O'Connor

[57] ABSTRACT

A pulse width modulation system for encoding and decoding digital information in which the encoded signal comprises a series of transitions among different signal levels wherein the length of time between transitions determines the value of a digit, so that each digit is represented by one and only one transition.

21 Claims, 4 Drawing Figures

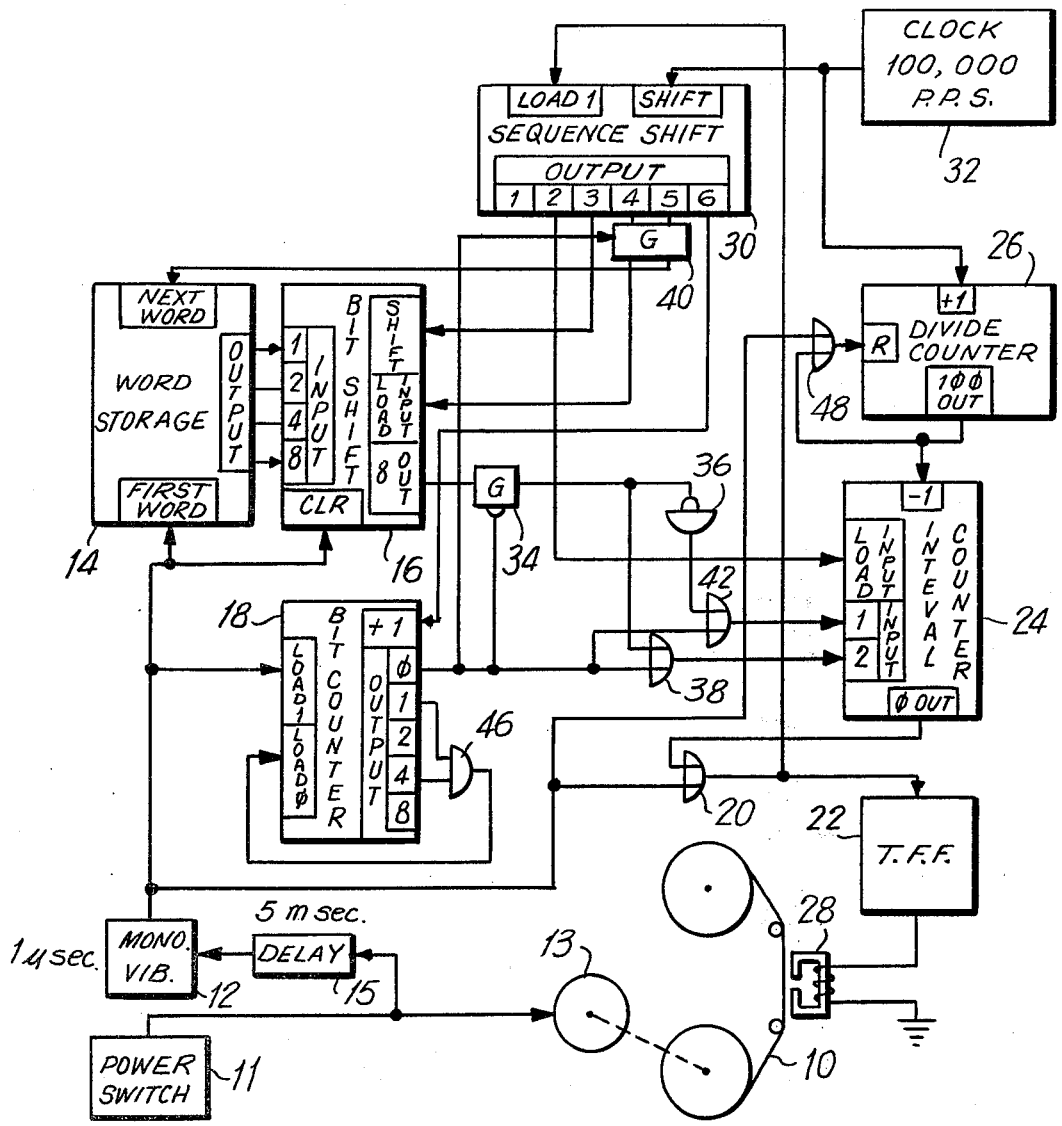

PULSE WIDTH MODULATION SYSTEM

BACKGROUND OF THE INVENTION

This invention relates to apparatus for encoding digital information into, and decoding it from, a signal capable of being recorded on magnetic tape or other recording medium. It is of particular utility in apparatus for recording and reading digital information in which insensitivity to variations in speed of the recording medium is desired.

In the prior art, variable-ratio pulse width modulation systems which require two transitions per digit are shown in Wolf U.S. Pat. No. 3,720,927 and Spiecens U.S. Pat. No. 3,959,816. In these systems the total time for the two successive transitions defining each digit is constant. Minnesota Mining and Manufacturing Company (3M) makes a variable-ratio system requiring two transitions per digit wherein one transition is of fixed length and the other transition is of variable length, so that the total time, or cell width, of the two transitions is not constant.

Murphy U.S. Pat. No. 4,021,853 shows a phase modulation system, which generally provides one transition per digit but frequently provides only one transition for two digits. Phase modulation systems are notoriously subject to noise and are extremely sensitive to speed variations of the recording medium.

SUMMARY OF THE INVENTION

One object of our invention is to provide a pulse width modulation system for encoding and decoding digital information which requires less bandwidth than pulse width modulation systems of the prior art.

Another object of our invention is to provide a pulse width modulation system for encoding and decoding digital information in which each digit is represented by one and only one transition among signal levels.

A further object of our invention is to provide a system for encoding and decoding digital information which is relatively insensitive to variations in speed of the recording medium.

Other and further objects of our invention will appear from the following description.

In general our invention contemplates a pulse width modulation system in which each digit is represented by one and only one transition between at least two signal levels or states. The length of time or distance between transitions determines the value of the digit associated with each transition. A first length between two consecutive transitions is associated with a first digital value, and a second length between two consecutive transitions is associated with a second digital value. If desired, a third length is associated with a third digital value, which may, for example, indicate a gap between multiple-digit characters. In receiving or reading information, the time intervals between transitions are measured and used to correct for variations in speed.

BRIEF DESCRIPTION OF THE DRAWINGS

In the accompanying drawings which form part of the instant specification and which are to be read in conjunction therewith and in which like reference numerals are used to indicate like parts in the various views:

FIG. 2 is a schematic view showing apparatus for encoding digital information.

DESCRIPTION OF THE PREFERRED EMBODIMENT

Figure 1:
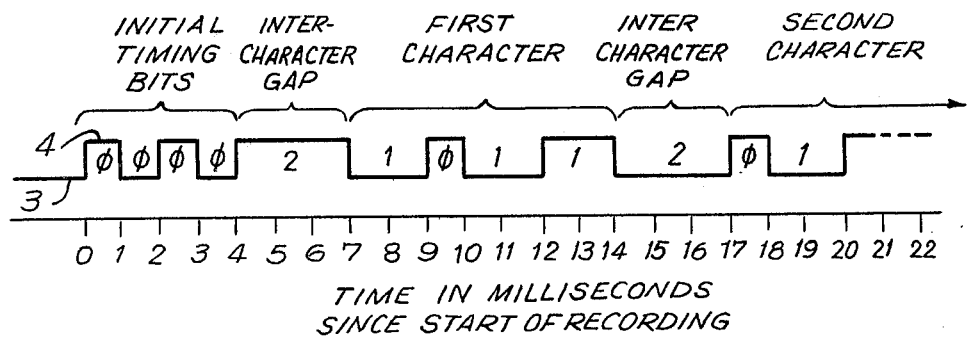
FIG. 1 is a graph of signal level or state versus time for a typical sequence of digits.

Our invention relates to apparatus for encoding and decoding digital information by a pulse width modulated signal, such as that shown in FIG. 1. The signal consists of a series of transitions or changes in signal level, such as changes in flux from one magnetic polarity, as indicated by the numeral 3, to the opposite magnetic polarity, as indicated by the numeral 4. As can be seen from FIG. 1, the time interval between transitions is associated with a digital value, such as 0, 1, and 2. Zero and one may represent the two binary digital values and the value two may indicate a gap between characters or groups of four bits. Similarly, in the decoding apparatus described below, transitions occurring at one frequency will result in the reading of a series of digits of one value and transitions occurring at another frequency will result in the reading of a series of digits of another value.

In FIG. 1, an initial group of four zeroes followed by an intercharacter gap is provided for timing purposes to enable the decoding or reading circuit to be synchronized. This is followed by a series of characters, each composed of four binary digits followed by an intercharacter gap, which allows a reading circuit to resynchronize itself with each new character. The signal shown in FIG. 1 is produced by a recording apparatus in which a "zero" is indicated by a 1 millisecond interval between transitions, a "one" by a 2 millisecond interval, and a "two" or gap by a 3 millisecond interval between transitions.

FIG. 2 illustrates an embodiment of our invention for recording on a length of tape 10, a signal such as that shown in FIG. 1. All of the digital logic shown is positive unless otherwise indicated.

The apparatus of FIG. 2 is started by actuating a switch 11 which applies power to a tape drive motor 13 and which, after a five millisecond delay provided by circuit 15, triggers a monostable multivibrator 12. Multivibrator 12 emits a one microsecond pulse. This initialization pulse causes a character or word storage device 14 to provide the first character or word to the input of a bit shift register 16. The initialization pulse also clears register 16 and loads a value of 1 into a bit counter 18 which is an up counter. The initialization pulse is also coupled through an OR circuit 20 to trigger a toggle flip-flop 22.

The output of toggle flip-flop 22 changes states, and produces a preliminary transition, shown at 0 milliseconds in FIG. 1, to be recorded on tape 10 by recording head 28. The pulse from multivibrator 12 is also coupled through an OR circuit 48 to the reset input of a divide counter 26, setting this up counter to a count of 0. The output of OR circuit 20 also loads a 1 into the first stage of a six stage register 30.

When a 100,000 pulse-per-second clock 32 thereafter emits another pulse, register 30 is shifted, causing the 1 formerly loaded into the first stage to be shifted to the second stage, and activating the load input line of an interval counter 24.

With bit counter 18 loaded to 1 by the initialization pulse, its 0 out line is low, which removes the inhibiting of a gate 34. This permits the most significant or 8 out bit of shift register 16 to be coupled through gate 34. Since the initialization pulse clears register 16 and thus fills it with zero bits, the 8 out line is low. This causes an inverter 36 to produce a high output which is coupled through an OR circuit 42 to the 1 input line of interval counter 24. Hence the activation of the load input line of counter 24 causes a 1 to be loaded therein.

Upon the second pulse from clock 32, register 30 is shifted so that only its third output line is high, which in turn shifts register 16 so that the value of what was formerly its second most significant bit is now placed on its 8 out line. Since register 16 was cleared to zeroes by the initialization pulse, the 8 out line remains low.

The next two pulses from clock 32 successively cause the fourth and fifth output lines of register 30 to be high. But because the 0 out line of bit counter 18 is low, a gate 40 is not enabled.

The next clock pulse causes the sixth output line of register 30 to go high. This indexes bit counter 18 from a count of 1 to 2. The next clock pulse causes the 1 to be shifted out of register 30; and the outputs of all stages are now low.

Clock source 32 indexes counter 26 until the number of pulses counted reaches 100, whereupon the 100 out line thereof goes high, which resets counter 26 through OR circuit 48 so that it can immediately start counting out a new time period of 100 clock pulses totaling 1 millisecond in duration. The output of counter 26 also decreases the count stored in interval counter 24 from 1 to 0. The 0 out line of counter 24 now goes high, which through OR circuit 20, triggers toggle flip-flop and causes the second transition occurring at a time of 1 millisecond in FIG. 1 to be recorded.

The triggering of flip-flop 22 also loads a 1 into register 30. The next five clock pulses will successively cause the second through sixth output lines of register 30 to go high. When the second output line goes high, interval counter 24 will be loaded with a value of 1 since the second bit of register 16 is a 0. When the third output line goes high, register 16 is shifted to provide its third bit, which is a 0. The fourth and fifth output lines of register 30 again have no effect, since gate 40 is not enabled. When the sixth output line of register 30 goes high, the bit counter 18 is indexed from 2 to 3. The next clock pulse shifts the 1 out of register 30.

When divide counter 26 again reaches a count of 100, its 100 out line becomes positive, resetting counter 26 to 0 and decreasing the count of interval counter 24 from 1 to 0. The 0 out line of counter 24 goes high, causing toggle flip-flop 22 to change state again so that the third transition occurring at 2 milliseconds in FIG. 1 is recorded, and loading a 1 into register 30.

During the next 100 clock pulses, interval counter 24 is loaded with a 1, since the third bit of register 16 is 0; register 16 is then shifted to provide its fourth bit which is a 0; bit counter 18 is indexed from 3 to 4; and toggle flip-flop 22 is triggered to record the fourth transition at 3 milliseconds in FIG. 1.

During the next 100 clock pulses, interval counter 24 is loaded with a 1, since the fourth bit of register 16 is 0; bit counter 18 is indexed from 4 to 5; and toggle flip-flop 22 is triggered to record the fifth transition at 4 milliseconds in FIG. 1.

An output of 5 from bit counter 18 is sensed by an AND circuit 46, which resets the counter to 0. This disables gate 34, enables gate 40, and applies a 2+1=3 input to counter 24 through OR circuits 38 and 42.

During the next 100 clock pulses, interval counter is loaded with a 3 by the second output of register 30; the first word output of storage device 14 is loaded into register 16 by the fourth output of register 30 coupled through gate 40; the next word from storage device 14 is thereafter provided by the fifth output of register 30 coupled through gate 40; bit counter 18 is indexed from 0 to 1; and at the end of the period, interval counter is indexed from 3 to 2. However, since counter 24 does not provide a 0 out, no 1 is loaded into shift register 30.

At the end of the next 100 clock pulses, interval counter 24 is indexed from 2 to 1; and at the end of a further 100 clock pulses counter 24 is indexed from 1 to 0. The 0 out line of counter 24 triggers flip-flop 22 to provide the transition at 7 milliseconds in FIG. 1, and loads a 1 into register 30.

During the next 100 clock pulses, the second output of register 30 causes the most significant or 8 out bit of the first word in register 16, which bit is a 1, to be loaded into the 2 input of counter 24 through OR circuit 38; the third output of register 30 shifts register 16 to provide the next bit, which is a 0, of the first word on the 8 out line; the sixth output of register 30 indexes bit counter 18 from 1 to 2; and at the end of the period counter 24 is indexed from 2 to 1. However, since counter 24 does not provide a 0 out, no 1 is loaded into register 30.

At the end of the next 100 clock pulses, counter 24 is indexed from 1 to 0, triggering flip-flop 22 to provide the transition and 9 milliseconds in FIG. 1, and loading a 1 into shift register 30.

It will be seen that the apparatus of FIG. 1 records a sequence of data characters separated by intercharacter gaps. After each transition of toggle flip-flop 22, interval counter 24 is loaded so as to provide a period of 1, 2, or 3 milliseconds before the next transition, depending upon whether the next interval is to represent a digital value of 0, 1, or 2, respectively. Interval counter 24 measures a length of time corresponding to the value of each bit of a given data word loaded in bit shift register 16, from the most significant to the least significant bit, until bit counter 18 indicates that interval counter 24 has been loaded with the least significant bit. Interval counter 24 is thereafter loaded with a gap value to indicate completion of the data word. Bit shift register 16 is then loaded with the values of the next data word; and an indication is given to word storage device 14 that still another data word should be prepared for subsequent input to bit shift register 16.

It will be noted that although the encoding apparatus provides flux transitions at predetermined intervals of time, the net effect is to record flux transitions at intervals of varying distance upon tape 10. Thus it can be seen that our invention encompasses the encoding of digital information by varying the time or the distance between transitions among signal states. Similarly, in the decoding apparatus shown below the time measurements used to recover the original digital values are in effect measurements of the distance between flux transitions recorded on tape 10.

Figure 3:
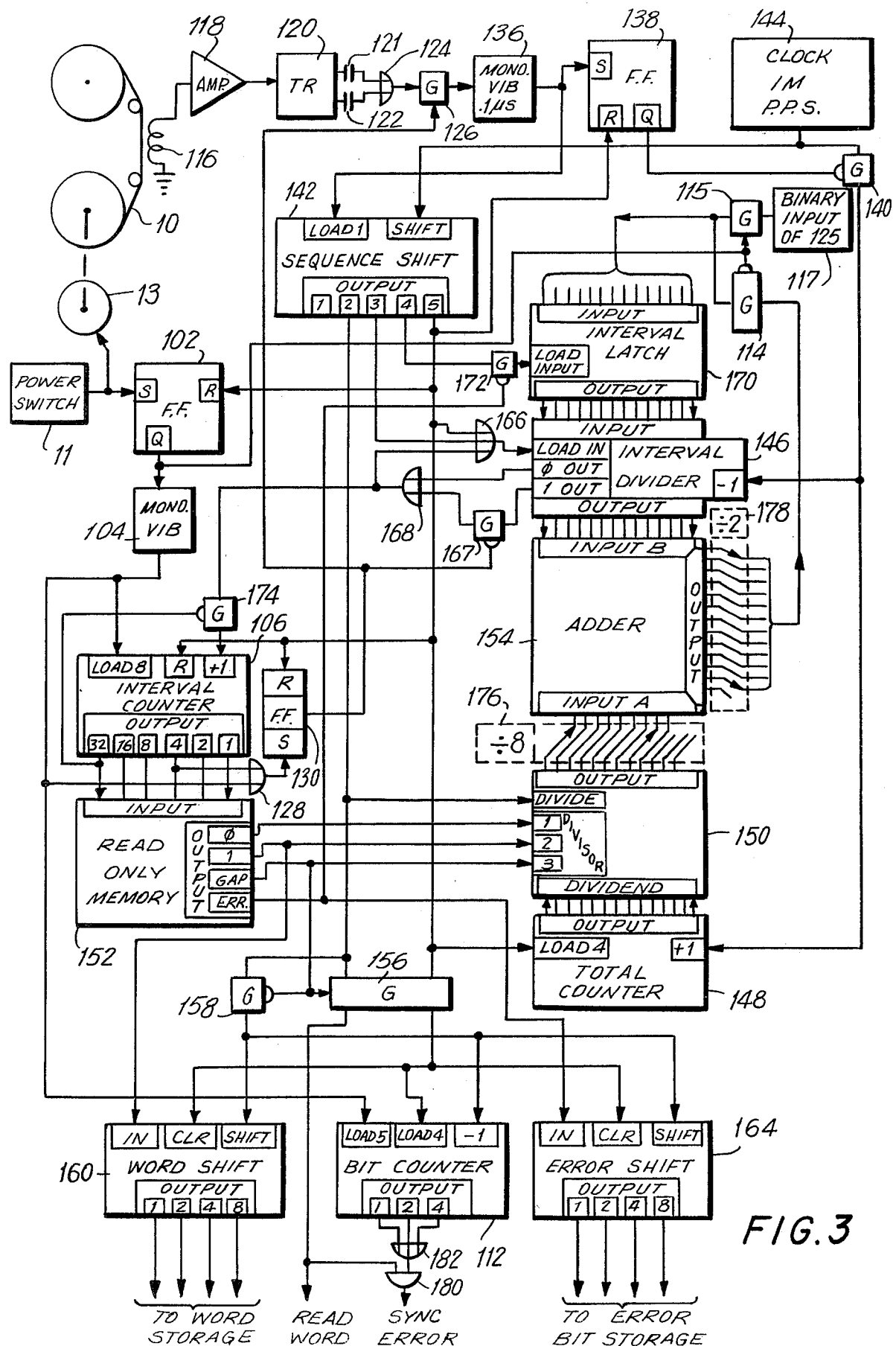
FIG. 3 is a schematic view showing apparatus for decoding digital information.

FIG. 3 illustrates an embodiment of our invention which is capable of decoding or reading a signal, once it has been recorded on a length of tape. For purposes of example, we will describe how this decoding apparatus might read the signal shown in FIG. 1 once it has been recorded by the apparatus shown in FIG. 2 upon tape 10. It should be obvious, however, that our invention may be used to read signals recorded on other than magnetic recording media, or transmitted over wires or by electromagnetic waves.

The decoding apparatus is started by actuating switch 11 which applies power to tape drive motor 13 and sets a flip-flop 102. The Q output thereof goes high, causing monostable multivibrator 104 to be triggered. The output pulse of multivibrator 104 loads a value of 8 into an interval counter 106, loads a value of 5 into a bit counter 112, and through an OR circuit 128 sets a flip-flop 130. The Q output of flip-fop 102 also disables a gate 114 and enables a gate 115.

When the first transition in a data block recorded on tape 10 passes reading head 116, a voltage is induced in the reading head. A flux change in one direction will produce a positive voltage pulse in head 116 and a flux change in the opposite direction will produce a negative voltage pulse in head 116. These voltage pulses are amplified by amplifier 118 and fed to a Schmitt trigger circuit 120. The outputs of trigger circuit 120 are coupled through differentiating capacitors 121 and 122 to an OR circuit 124. The output of OR circuit 124 is coupled through a gate 126, enabled by the setting of flip-flop 130, to trigger a monostable multivibrator 136, providing an output pulse of 0.1 microsecond duration. This pulse sets a flip-fop 138 so that its Q output is high, disabling a gate 140, and also loads a 1 into the first stage of a five stage shift register 142.

Register 142 is shifted by a one million pulse-per-second clock source 144. The next four clock pulses from source 144 sequentially causes the second through fifth output lines of register 142 to go high. When the second output line of register 142 goes high, a divider circuit 150 is actuated, causing it to divide the dividend supplied from a total counter 148 by the divisor supplied from a read only memory 152. The quotient output of circuit 50 is divided by eight and fed as input A to an adder 154. The division by eight is accomplished merely by a shift of three binary places of significance as indicated by the reference numeral 176. The three least significant bits of divider 150 are not used, since the 8 out bit of divider 150 is connected to the 1 input A bit of adder 154.

Figure 4:
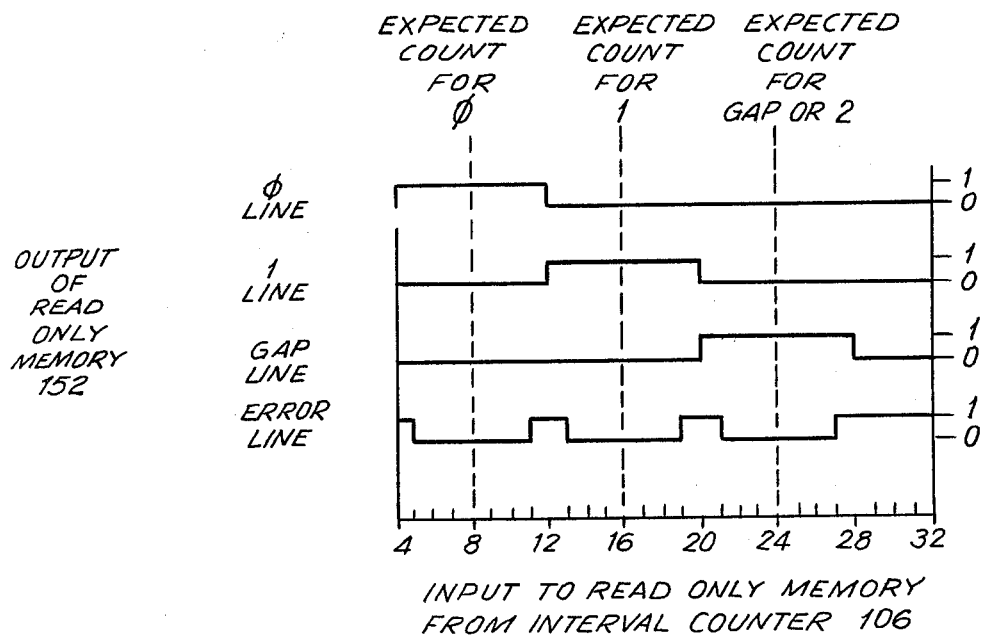
FIG. 4 is a graph showing the interpretation of decoded information.

FIG. 4 shows the correlation between the value stored in interval counter 106, which provides the input to memory 152, and the output of memory 152. As may be seen from FIG. 4, when the value of interval counter 106 is 8, only the 0 out line of memory 152 is high. Thus, total divider 150 will divide the output of total counter 148 by 1.

The second output of register 142 is also applied to a gate 158 which is enabled if the gap output line of memory 152 is low. From FIG. 4 it will be seen that for an 8 input to memory 152 the gap output line is low. Thus, the second output of register 142 is coupled through gate 158 to shift word and error registers 160 and 164 and to index bit counter 112 from 5 to 4. The 1 out line of memory 152 is connected to the input of word register 160; and the error out line of memory 152 is connected to the input of error register 164. For an 8 input, the 1 out and the error out lines of memory 152 are low. Accordingly, a zero is shifted into each of registers 160 and 164.

The fourth output of register 142 is coupled through a gate 172 to the load input of an interval latch 170. Gate 172 is disabled only if the error out line of memory 152 is high. When the load input to interval latch 170 is made high, the value placed on its input lines is stored therein. Since flip-flop 102 is set, gate 115 is enabled to feed an initial binary input of 125 from circuit 117 to interval latch 170. This value of 125 is loaded into the latch 170 when the fourth output of register 142 goes high.

The fifth output of register 142 resets flip-flop 138, enabling gate 140 to couple clock pulses to an interval dividing counter 146 and to the total counter 148. The fifth output also resets flip-flop 102, disabling gate 115 and enabling gate 114. The fifth output of register 142 is coupled through an OR circuit 166 to the load input of counter 146, which causes the 125 output of latch 170 to be set into counter 146. The fifth output also resets interval counter 106 to 0, resets flip-flop 130, and loads total counter 148 with a value of 4. The value of 4 loaded into counter 148 compensates for the four clock pulses not counted during operation of register 142 which have occurred since the first transition.

Pulses from clock 144 decrease the count of interval divider 146 and increase the count of total counter 148. Total counter 148 records the total number of clock pulses which occur between two flux transitions. Interval divider 146 divides the total number of clock pulses which are fed to it between two such transitions by the value which is stored in the interval latch. The resetting of flip-flop 130 enables a gate 167 which receives a signal when the count of interval divider 146 has been reduced to 1. The 1 out line of counter 146 is coupled through gate 167 to an OR circuit 168. The output of OR circuit 168 is coupled through OR circuit 166 to reload divider 146 with the output of latch 170 and is coupled through a gate 174 to index counter 106 from 0 to 1. After three more periods each of 124 clock pulses, the 1 out line of counter 146 successively indexes counter 106 from 1 to 2, from 2 to 3, and from 3 to 4. The time elapsed since the first transition is 500 microseconds; counter 148 has a count of 500; and counter 106 has an output of 4, correctly indicating that 4×125=500 clock pulses have occurred. The 4 out line of counter 106 is coupled through OR circuit 128 to set flip-flop 130. This disables gate 167 and enables gate 126 to respond to the subsequent transition on tape 10. Thereafter, counter 146 counts periods of 125 instead of 124 clock pulses. After each period of 125 clock pulses, to 0 out line of counter 146 becomes high and, through OR circuit 168, reloads divider 146 and indexes counter 106.

To illustrate the speed insensitive nature of the decoding apparatus shown in FIG. 3, we will assume that the second flux transition of FIG. 1, is read from tape 10 by head 116 at 1.125 milliseconds after the first transition. As shown in FIG. 1, this transition was recorded 1 millisecond after the first; but, either because the recording tape was moving faster than appropriate at the time of recording, or slower than appropriate at the time of playback, the time interval between the sensing of the first and second transition is assumed to have increased.

Upon the sensing of the second flux transition, a voltage is generated in head 116 which is amplified by amplifier 118 and triggers circuit 120. The pulse from one of capacitor 121 and 124 is coupled through OR circuit 124 and gate 126 to actuate multivibrator 136. The output pulse of multivibrator 136 sets flip-flop 138, disabling gate 140, and preventing clock pulses from changing the counts in interval divider 146 and total counter 148. The output pulse of multivibrator 136 also loads a 1 into shift register 142. The next four clock pulses result in sequential high outputs on the second through fifth lines of register 142.

When the second output of register 142 goes high, total divider 150 divides the number in total counter 148 by either 1, 2, or 3, depending upon the output of memory 152. The count of total counter 148 is 1125; and the count in interval counter 106 is 1125/125=9. Only the 0 out line of memory 152 is high, as shown in FIG. 4. Total divider 150 thus divides the count of 1125 in total counter 148 by 1; and one eighth of this, or 1125/8=140, is fed through circuit 176 into input A of adder 154.

Also upon this high signal from the second output of register 142, the output of gate 158 will go high, because the gap out line of memory 152 is low, enabling gate 158. This high output from gate 158 causes registers 160 and 164 to be shifted, thus loading a 0 into their least significant digits, since both the 1 out and the error out lines of memory 152 are low. The output of gate 158 also decreases the count of bit counter 112 from 4 to 3.

Upon the next clock pulse, the third output line of register 142 is coupled through OR circuit 166 and causes the value of 125 stored in interval latch 170 to be loaded into interval divider 146, and thus applied to input B of adder 154. Adder 154 now provides an output of 125+140=265. The output of adder 154 is divided by two and coupled through gate 114 to the input of latch 170. The division by two is accomplished merely by a shift of one binary place of significance as indicated by the reference numeral 178. The least significant bit of adder 154 is not used, since the 2 out bit of adder 154 is applied, through gate 114, to the 1 input bit of latch 70. The input to latch 170 is thus 265/2=132.

The fourth output of register 142 is coupled through gate 172 and causes the value of 132 at the input of latch 170 to be loaded therein and appear on its output lines. The fifth output line of register 142 resets flip-flop 138, which enables gate 140 to couple clock pulses to decrease the count of divider 146 and to increase the count of total counter 148. The fifth output line of register 142 also resets interval counter 106 to 0, resets flip-flop 130, and loads a 4 into total counter 148, corresponding to the number of clock pulses which have occurred since the second transition but have not been counted. The high signal on the fifth output line of register 142 also causes the new interval value of 132 in latch 170 to be loaded into interval divider 146.

After a period of 132−1=131 clock pulses, counter 146 provides a 1 out which is coupled through gate 167 to reload divider 146 with a count of 132 and to index counter 106 from 0 to 1. After three more periods of 131 clock pulses each, counter 106 will be indexed from 1 to 2, to 3, and to 4. The 4 output of counter 106 sets flip-flop 130, disabling gate 167, so that subsequent periods of 132 clock pulses will be terminated by the 0 out line of interval divider 146 which reloads the divider and indexes counter 106. The setting of flip-flop 130 also enables gate 126 to respond to the next transition.

We will assume that the tape drive motor 13 slows down even more and that the time interval between the sensing of the second and third transitions is 1.25 milliseconds. The sensing of the third transition triggers multivibrator 136, loading a 1 into register 142 and setting flip-flop 138, which disables gate 140. The count in total counter 148 is 1250; and the count in interval counter 106 is 1250/132=9. The second output of register 142 causes total divider 150 to divide 1250 by 1, since memory 152 provides a high 0 out for a 9 input from counter 106, as shown in FIG. 4. The output of total divider 150 is 1250; and input A of adder A is 1250/8=156 because of circuit 176. The second output of register 142 is also coupled through gate 158, shifting a 0 into register 160 since the 1 out line of memory 152 is low, shifting a 0 into register 164 since the error out line of memory 152 is low, and indexing bit counter 112 from 3 to 2.

The third output of register 142 causes divider 146 to be loaded with the 132 value of the output of latch 170, which value is applied to input B of adder 154. Adder 154 now provides an output of 132+156=288; and because of circuit 178, half this sum or 228/2=144 is coupled through gate 114 to latch 170.

The fourth output line of register 142 causes this value of 144 to be loaded into latch 170. The fifth output of register 142 resets flip-flop 138, enabling gate 140 to apply clock pulses to interval divider 146 and total counter 148. The fifth output also loads the 144 value output of latch 170 into divider 146, resets counter 106 to 0, loads a 4 into counter 148, and resets flip-flop 130 which enables gate 167.

We will assume that tape 10 slows down even further, and that 1.444 milliseconds elapse before the sensing of the next flux transition recorded at 3 milliseconds in FIG. 1. The count in total counter 148 is 1444 and the count in interval counter 106 is 1444/144=10. Again only the 0 out line of memory 152 is high.

During the next four clock pulses, register 142 governs the following events. The output of divider 150 is 1444/1=1444; and input A of adder 154 is 1444/8=180. A 0 is shifted into each of registers 160 and 164; and bit counter 112 is indexed from 2 to 1. Adder 154 provides an output of 180+144=324; and 324/2=162 is loaded into latch 170.

We will assume that the length of time between the sensing of the fourth transition and the fifth transition, recorded at 4 milliseconds in FIG. 1, now takes 1.6 milliseconds. It should be noted that this represents a 60% variation in speed from recording to playback.

When the fifth transition is sensed, the count in total counter 148 is 1600; and the count in interval counter 106 is 1600/162=9. Only the 0 out line of memory 152 is high. During the next four clock pulses, register 142 governs the following events. The output of divider 150 is 1600/1=1600; and input A of adder 154 is 1600/8=200. A 0 is shifted into each of registers 160 and 164; and bit counter 112 is indexed from 1 to 0. Adder 154 provides an output of 200+162=362; and 362/2=181 is loaded into latch 170.

It will be noted that even though the number of clock pulses between transitions has risen from 1125 to 1600 in 4 milliseconds, the decoding apparatus has adapted to that change in speed and has accurately read the digital value of zero of each of the first four digits.

The next, or sixth, transition sensed is that recorded at 7 milliseconds in FIG. 1. This transition was recorded 3 milliseconds after the fifth transition. We will assume that the length of time between the sensing of the sixth and fifth transitions is 4.3 milliseconds, and that the speed of motor 13 increases during the time of playback of the gap character, each 1 millisecond during recording corresponding to 4.3/3=1.433 milliseconds during reading.

When the sixth transition is sensed, the count in total counter 148 is 4,300; and the count in counter 106 is 4300/181=23. As can be seen from FIG. 4, only the gap out line of memory 152 is high for a 23 input from counter 106. This provides a divisor of 3 for divider 150, disables gate 158, and enables a gate 156. During the next four clock pulses, register 142 governs the following events. The output of divider 150 is 4300/3=1433; and input A of adder 154 is 1433/8=179. Adder 154 provides an output of 181+179=360; and 360/2=180 is loaded into latch 170. Furthermore, the second output of register 142 is coupled through gate 156 to indicate that the outputs of word register 160 should be read or transferred as a group to a word storage device. The four output bits of register 160 are 0's corresponding to the four 0's recorded as an initial timing word or character.

The read word output of gate 156 is applied to one input of an AND circuit 180. The three output bits of counter 112 are coupled to an OR circuit 182, the output of which is applied to the other input of AND circuit 180. The AND circuit 180 provides a sync error signal if the output of bit counter 112 is not 0, thereby indicating an erroneous word containing either more or less than the proper number of four bits. Bit counter 112 should have the capability of being indexed to negative counts as would occur if an erroneous word contained five or more bits.

The fifth output of register 142 is coupled through gate 156 to clear registers 160 and 164 and to load a 4 into bit counter 112. Bit counter 112 was initially loaded with a value of 5 because of the initial transition at 0 milliseconds in FIG. 1.

We will assume that tape 10 speeds up slightly more before the reading of the seventh transition recorded at 9 milliseconds in FIG. 1. The time between this transition and that which precedes it will be assumed to be 2.5 milliseconds, each 1 millisecond during recording corresponding to 1.25 milliseconds during reading. When this transition is sensed, the count in total counter 148 is 2500; and the count in interval counter 106 is 2500/180=13. As can be seen from FIG. 4, only the 1 out line of memory 152 is high for a 13 input from counter 106. This provides a divisor of 2 for divider 150 and a high input to register 160. During the next four clock pulses, register 142 governs the following events. The output of divider 150 is 2500/2=1250; and input A of adder 154 is 1250/8=156. Adder 154 provides an output of 156+180=336; and 336/2=168 is loaded into latch 170. The second output of register 142 shifts the 1 output of memory 152 into register 160, shifts a 0 into register 164 since the error out line of memory 152 is low, and indexes bit counter 112 from 4 to 3.

As may be seen by reference to FIG. 4, counts of counter 106 from 4 through 11 are interpreted as a 0, counts of 12 through 19 are interpreted as a 1, and counts of 20 through 27 are interpreted as a 2 or gap. To indicate possibly ambiguous or erroneous interpretations, the error out line of memory 152 is high for counts of 4, 11 and 12, 19 and 20, and 27 through 32. If the error out line of memory 152 is high, a 1 is shifted into register 164 in response to the second output of register 142 coupled through gate 158 at the same time the value of the ambiguous bit is shifted into register 160. When the read word signal is given, the 0 output bits of register 164 will indicate valid interpretations of corresponding output bits of register 160, and any 1 output bit of register 164 will indicate an ambiguous or erroneous interpretation of the corresponding output bit of register 160. The error out line of memory 152 also disables gate 172 and prevents latch 170 from being loaded with a new value based upon a doubtful or ambiguous interpretation. The 32 output bit of counter 106 disables gate 174, preventing any further change in count. Gate 126 is enabled only when the output of counter 106 reaches 4. Thus a noise pulse occurring less than nominally one-half millisecond after a valid transition will be ignored. Memory 152 need respond only to outputs of counter 106 from 4 through 32.

The decoding apparatus of FIG. 3 responds similarly to the remaining transitions of the first character and of the gap following the first character. Every time a transition is sensed, total counter 148 will provide the number of microseconds which have elapsed since the previous transition; and interval counter 106 will provide a count of the integral number of times the current interval value can be divided into the number of microseconds elapsed. Memory 152 interprets the output of interval counter 106 as a 0, or a 1, or a 2 or gap, as shown in FIG. 4. If a transition is interpreted as either a 0 or a 1, that value is shifted into register 160. If a transition is interpreted as a 2 or gap, a read word signal is provided which indicates to a reading or storage device that the four output bits of register 160 represent a complete word or character and that the validity of the output bits of register 160 is correspondingly indicated by the four output bits of register 164. A synchronization error signal will be simultaneously given if the word contains either more or less than the proper number of four bits.

We have shown the new interval value of latch 170 to be equal to half the sum of the output of divide-by-eight circuit 176 and the old interval value. Thus if the prior interval value is 120 and the output of circuit 176 is 128, the new interval value is 124. If upon the subsequent transition, the output of circuit 176 is again 128, the new interval value is 126. It will be noted that each change in interval value is half the difference between the output of circuit 176 and the old interval value. Increased smoothing may be obtained providing a change in interval value of, for example, one-third the difference between the output of circuit 176 and the old interval value. Thus, the new interval value would be equal to one-third the sum of the output of circuit 176 and twice the old interval value.

While we have shown only two signal states, the flux level 4 of one polarity and the flux level 3 of the opposite polarity, it will be understood that further flux levels or signal states may be used to provide additional information by pulse amplitude modulation combined with the pulse width modulation shown.

It will be seen that we have accomplished the objects of our invention. Unlike previous pulse width modulation systems which require two transitions to convey one bit of information, we have provided a pulse width modulation system which requires one and only one additional transition among signal states to represent one additional bit or digit, thus reducing the required bandwidth. Because of the wide range of time for a valid interpretation of the value of a digit, our system is relatively insensitive to variations in speed between recording and playback. Furthermore, our system rapidly adapts to and compensates for any such relative speed variations.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Decoding apparatus for a signal having three consecutive transitions between at least two signal levels including in combination means providing a plurality of discretely different reference time intervals, means responsive to the signal for measuring the time intervals between successive transitions, output means responsive to the measuring means and to the reference means for serially providing a first and a second digit each having one of a corresponding plurality of values, the output means comprising means responsive to a measured interval approximately equal to one of the reference intervals for providing a digit the value of which corresponds to such reference interval, and means responsive to the measuring means and operable subsequent to the provision of the first digit but prior to the provision of the second digit for adjusting the reference intervals.

2. Decoding apparatus for a signal having four consecutive transitions between at least two signal levels including in combination means providing a plurality of discretely different reference time intervals, means responsive to the signal for measuring the time intervals between successive transitions, output means responsive to the measuring means and to the reference means for serially providing three digits each having one of a corresponding plurality of values, the output means comprising means responsive to a measured interval approximately equal to one of the reference intervals for providing a digit the value of which corresponds to such reference interval, and means responsive to the measuring means and operable subsequent to the provision of each digit but prior to the provision of each succeeding digit for adjusting the reference intervals.

3. Apparatus as in claim 1 or 2 wherein the adjusting means includes means for solving an equation of the form $$R = cr + m/c + 1 = r + m - r/c + 1$$

where r is a reference interval, where m is a measured interval, where c is a constant greater than zero, and where R is an adjusted reference interval.

4. Decoding apparatus for a signal having three consecutive transitions between at least two signal levels including in combination means providing a first reference time interval and discretely greater second and third reference time intervals, means responsive to the signal for measuring the time intervals between successive transitions, and output means responsive to the measuring means and to the reference means for serially providing a first and a second digit each having one of at least two values, the output means comprising means responsive to a measured interval which is greater than the first reference interval but less than the second reference interval for providing a digit having a first value and means responsive to a measured interval which is greater than the second reference interval but less than the third reference interval for providing a digit having a second value.

5. Apparatus as in claim 4 further including means responsive to a measured interval approximately equal to one of the reference intervals for providing an output signal.

6. Apparatus as in claim 4 further including means responsive to a measured interval greater than the third reference interval for providing an output signal.

7. Apparatus as in claim 4 wherein the first reference interval is approximately one-third the second reference interval.

8. Apparatus as in claim 4 wherein the measuring means includes means for suppressing any transition which would otherwise produce a measured interval less than the first reference interval.

9. Apparatus as in claim 4 further including means responsive to the measuring means and operable subsequent to the provision of the first digit but prior to the provision of the second digit for adjusting the reference intervals.

10. Decoding apparatus for a signal having three consecutive transitions between at least two signal levels including in combination means providing a first reference time interval and a plurality of discretely greater reference time intervals, means responsive to the signal for measuring the time intervals between successive transitions, and output means responsive to the measuring means and to the reference means for serially providing a first and a second digit each having one of a corresponding plurality of values, the output means comprising means responsive to a measured interval which is bounded by two reference intervals for providing a digit having a value corresponding to that one of the plurality of reference intervals providing the upper boundary.

11. Apparatus as in claim 10 wherein the first reference interval is approximately one-third the smallest of the plurality of reference intervals.

12. Apparatus as in claim 10 further including means responsive to a measured interval approximately equal one of the reference intervals for providing an output signal.

13. Apparatus as in claim 10 further including means responsive to a measured interval greater than the largest of the plurality of reference intervals for providing an output signal.

14. A pulse-width modulation system including in combination input means for providing a first and a second digit each having one of at least two values, means for providing a signal having one of at least two discrete levels, means for producing a first change in the level of the signal, timing means, means sequentially coupling the first and second digits to the timing means, the timing means providing one of at least two discrete time intervals in accordance with the value of the digit coupled thereto, means responsive to the timing means for producing a second change in signal level the time interval of which from the first change is in accord with the value of the first digit and for producing a third change in signal level the time interval of which from the second change is in accord with the value of the second digit, each digit producing one and only one change in signal level, output means for providing digits each having one of at least two values, and means responsive to the signal providing means for controlling the output digit providing means, the controlling means comprising means responsive to the interval of time between the first and second signal transitions for providing a first output digit the value of which is in accord with such interval of time and agrees with the first input digit and means responsive to the interval of time between the second and third signal transitions for providing a second output digit the value of which is in accord with such interval of time and agrees with the second input digit, wherein the timing means includes a counter, the first and second digits being sequentially coupled to the counter, each digit setting the counter to a count in accordance with the value of such digit, an oscillator, means responsive to the oscillator for successively decreasing the count of the counter, and means providing an output upon decrease of said count to a predetermined count, said output being coupled to the signal providing means to produce said second and third changes in signal level.

15. A pulse-width modulation system including in combination input means for providing a first and a second digit each having one of at least two values, means for providing a signal having one of at least two discrete levels, means for producing a first change in the level of the signal, timing means, means sequentially coupling the first and second digits to the timing means, the timing means providing one of at least two discrete time intervals in accordance with the value of the digit coupled thereto, means responsive to the timing means for producing a second change in signal level the time interval of which from the first change is in accord with the value of the first digit and for producing a third change in signal level the time interval of which from the second change is in accord with the value of the second digit, each digit producing one and only one change in signal level, output means for providing digits each having one of at least two values, and means responsive to the signal providing means for controlling the output digit providing means, the controlling means comprising means responsive to the interval of time between the first and second signal transitions for providing a first output digit the value of which is in accord with such interval of time and agrees with the first input digit and means responsive to the interval of time between the second and third signal transitions for providing a second output digit the value of which is in accord with such interval of time and agrees with the second input digit, wherein the timing means has an output, wherein the signal providing means has an input, wherein the output of the timing means is coupled to the input of the signal providing means, and wherein the first change means includes means operable independently of the timing means to provide a pulse and means coupling said pulse to the input of the signal providing means.

16. Decoding apparatus for a signal having a first and a second and a third consecutive transition between at least two signal levels, wherein the nominal time interval between the first and second transitions and the nominal time interval between the second and third transitions each has one of two discretely different expected durations, including in combination means providing a first reference time interval substantially equal to one expected duration and a second discretely different reference time interval substantially equal to the other expected duration, means responsive to the signal for measuring the actual time interval between the first and second transitions and the actual time interval between the second and third transitions, and output means responsive to the measuring means and to the reference means for providing two digits each having one of at least two values, the output means comprising means responsive to an approximate equality between a measured interval and the first reference interval for providing a digit having a first value and means responsive to an approximate equality between a measured interval and the second reference interval for providing a digit having a second value.

17. Decoding apparatus for a signal having a first and a second and a third consecutive transition between at least two signal levels, wherein the nominal time interval between the first and second transitions and the nominal time interval between the second and third transitions each has one of a plurality of discretely different expected durations, including in combination means providing a corresponding plurality of discretely different reference time intervals, each reference time interval being substantially equal to a corresponding expected duration, means responsive to the signal for measuring the actual time interval between the first and second transitions and the actual time interval between the second and third transitions, and output means responsive to the measuring means and to the reference means for providing two digits each having one of a corresponding plurality of values, the output means comprising means responsive to an approximate equality between a measured interval and one of the reference intervals for providing a digit the value of which corresponds to such reference interval.

18. Encoding apparatus including in combination means for providing a first and a second digit each having one of at least two values, means for providing a signal having one of at least two discrete levels, means for producing a first change in the level of the signal, timing means, means sequentially coupling first and second digits to the timing means, the timing means providing one of at least two discrete time intervals in accordance with the value of the digit coupled thereto, and means responsive to the timing means for producing a second change in signal level the time interval of which from the first change is in accord with the value of the first digit and for producing a third change in signal level the time interval of which from the second change is in accord with the value of the second digit, each digit producing one and only one change in signal level, said first change means comprising means for providing one of said levels for a time period appreciably greater than the longest of said time intervals.

19. Encoding apparatus including in combination means for providing a first and a second digit each having one of at least three values, means for providing a signal having one of at least two discrete levels, means for producing a first change in the level of the signal, timing means, means sequentially coupling the first and second digits to the timing means, the timing means providing one of at least three discrete time intervals in accordance with the value of the digit coupled thereto, and means responsive to the timing means for producing a second change in signal level the time interval of which from the first change is in accord with the value of the first digit and for producing a third change in signal level the time interval of which from the second change is in accord with the value of the second digit, each digit producing one and only one change in signal level, said first change means comprising means for providing one of said levels for a time period appreciably greater than the longest of said time intervals.

20. A pulse width modulation system including in combination input means for providing a first and a second digit each having one of at least two values, means for providing a signal having one of at least two discrete levels, means for producing a first change in the level of the signal, timing means, means sequentially coupling the first and second digits to the timing means, the timing means providing one of at least two discrete time intervals in accordance with the value of the digit coupled thereto, means responsive to the timing means for producing a second change in signal level the time interval of which from the first change is in accord with the value of the first digit and for producing a third change in signal level the time interval of which from the second change is in accord with the value of the second digit, each digit producing one and only one change in signal level, output means for providing digits each having one of at least two values, and means responsive to the signal providing means for controlling the output digit providing means, the controlling means comprising means responsive to the interval of time between the first and second signal transitions for providing a first output digit the value of which is in accord with such interval of time and agrees with the first input digit and means responsive to the interval of time between the second and third signal transitions for providing a second output digit the value of which is in accord with such interval of time and agrees with the second input digit, said first change means comprising means for providing one of said levels for a time period appreciably greater than the longest of said time intervals.

21. A pulse width modulation system including in combination input means for providing a first and a second digit each having one of at least two values, means for providing a signal having one of at least two discrete levels, means for producing a first change in the level of the signal, timing means, means sequentially coupling the first and second digits to the timing means, the timing means providing one of at least two discrete time intervals in accordance with the value of the digit coupled thereto, means responsive to the timing means for producing a second change in the signal level the time interval of which from the first change is in accord with the value of the first digit and for producing a third change in signal level the time interval of which from the second change is in accord with the value of the second digit, each digit producing one and only one change in signal level, output means for providing digits each having one of at least two values, and means responsive to the signal providing means for controlling the output digit providing means, the controlling means comprising means responsive to the interval of time between the first and second signal transitions for providing a first output digit the value of which is in accord with such interval of time and agrees with the first input digit and means responsive to the interval of time between the second and third signal transitions for providing a second output digit the value of which is in accord with such interval of time and agrees with the second input digit, the controlling means further comprising means responsive to the presence of one of said signal levels for a period of time discretely greater than the longest of said time intervals for providing an output signal, said first change means comprising means for providing one of said signal levels for a time period appreciably greater than said period of time.

* * * * *